(12) United States Patent
Barlas et al.

(10) Patent No.: US 12,443,059 B2
(45) Date of Patent: Oct. 14, 2025

(54) PLANAR CELL NANOHEATER DESIGN AND CELL ARCHITECTURE FOR PROGRAMMABLE PHASE CHANGE FILTERS

(71) Applicant: STMicroelectronics (Crolles 2) SAS, Crolles (FR)

(72) Inventors: Marios Barlas, Grenoble (FR); Kirill Shiianov, Grenoble (FR); Emmanuel Josse, La Motte Servolex (FR); Stephane Monfray, Eybens (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 540 days.

(21) Appl. No.: 17/958,803

(22) Filed: Oct. 3, 2022

(65) Prior Publication Data

US 2023/0109590 A1    Apr. 6, 2023

(30) Foreign Application Priority Data

Oct. 5, 2021  (FR) ........................................ 2110500
Oct. 5, 2021  (GR) .............................. 20210100676
Jan. 19, 2022 (FR) ........................................ 2200431

(51) Int. Cl.
*G02F 1/01*     (2006.01)
*H10F 39/00*   (2025.01)

(52) U.S. Cl.
CPC ......... *G02F 1/0147* (2013.01); *H10F 39/806* (2025.01); *G02F 2203/055* (2013.01); *G02F 2203/11* (2013.01)

(58) Field of Classification Search
CPC ............ G02F 1/0147; G02F 2203/055; G02F 2203/11; H10F 39/806
See application file for complete search history.

(56) References Cited

U.S. PATENT DOCUMENTS

| 10,437,083 | B1 | 10/2019 | Baleine et al. |
| 11,848,400 | B2* | 12/2023 | Stoeferle ................ H10K 50/82 |
| 2007/0051936 | A1* | 3/2007 | Pellizzer ............ H10N 70/8413 257/4 |
| 2010/0225989 | A1* | 9/2010 | Anders ..................... G02F 1/19 359/288 |

FOREIGN PATENT DOCUMENTS

| CN | 101689402 A | 3/2010 |
| CN | 219017886 U | 5/2023 |

OTHER PUBLICATIONS

First Office Action and Search Report for counterpart CN Appl. No. 202211229717.4, report dated Mar. 27, 2025, 6 pgs.
(Continued)

*Primary Examiner* — Jonathan Han
(74) *Attorney, Agent, or Firm* — Crowe & Dunlevy LLC

(57) ABSTRACT

A phase change filter is formed by an arrangement of dots, wherein each dot is made of a phase change material. A heating layer of electrically conductive material extends under the arrangement of dots. Current passing through the heating layer changes the dots between two states to alter attenuation of light passing through the filter.

26 Claims, 15 Drawing Sheets

(56) References Cited

OTHER PUBLICATIONS

Rios Carlos et al: "Reversible Switching of Optical Phase Change Materials Using Graphene Microheaters", 2019 Conference on Lasers and Electro-Optics (CLEO), OSA, May 5, 2019 (May 5, 2019), pp. 1-2, XP033569658, DOI: 10.23919/CLEO.2019. 8749567 [extrait le Jun. 27, 2019].
Trimby Liam et al: "Phase-change band-pass filters for multispectral imaging", Proceedings of SPIE; Proceedings of SPIE ISSN 0277-786X vol. 10524], SPIE, US, vol. 10541, Feb. 21, 2018 (Feb. 21, 2018), pp. 105412B-105412B, XP060106075, DOI: 10.1117/12. 2290405—ISBN: 978-1-5106-1533-5—p. 1-p. 2.
INPI Search Report and Written Opinion for priority application, FR 2200431, report dated Sep. 22, 2022, 9 pgs.

\* cited by examiner

PLANAR CELL NANOHEATER DESIGN AND CELL ARCHITECTURE FOR PROGRAMMABLE PHASE CHANGE FILTERS

PRIORITY CLAIM

This application claims the priority benefit of French Application for Patent No. 2110500, filed on Oct. 5, 2021; and the priority benefit of Greece Application for Patent No. 20210100676, filed on Oct. 5, 2021; and the priority benefit of French Application for Patent No. 2200431, filed on Jan. 19, 2022, the contents of which are hereby incorporated by reference in their entireties to the maximum extent allowable by law.

TECHNICAL FIELD

The present disclosure relates generally to Programmable Phase Change Filters, and in particular to a Planar Cell Nanoheater Design and Cell architecture for Programmable Phase Change Filters.

BACKGROUND

Refractive index change enabled by phase change materials has been utilized to achieve switching in integrated photonics, modulation of electromagnetic modes in periodic structures, and manipulation of local optical contrast.

SUMMARY

One embodiment provides a nanohole shaped heater for optimal control of the heat-front tailored to filter specific geometry and that allows to optimally reach critical phase change temperatures in a phase change filter.

One embodiment provides a specific geometrical and current level tailoring to minimize temperature field variability inside the filter region.

One embodiment provides a decoupling of high temperature regions from low temperature regions allowing the coexistence of organic optical lenses close to the phase change material cell region using transparent materials in order to: protect the optical stack from thermally-induced degradation; minimize the heating-cooling cycle; and allow for high light transmission.

One embodiment provides a phase change filter comprising: a plurality of dots, each dot being formed of a phase change material; and a heating layer of electrically conductive material, the heating layer comprising a plurality of heating zones, each heating zone comprising one or more conductive fingers, wherein a corresponding one of the dots is positioned on each heating zone of the heating layer.

One embodiment also provides a phase change filter comprising: a plurality of dots, each dot being formed of a phase change material, wherein the dots are formed in columns and rows of regular spacing, the pitch of the dots in the columns and rows being in the range 500 nm to 1000 nm.

According to an embodiment, the number of conductive fingers in each heating zone of the heating layer is equal to two.

According to an embodiment, the dots are formed in columns and rows of regular spacing.

According to an embodiment, the pitch of the dots in the columns and/or rows is in the range 500 nm to 1000 nm.

According to an embodiment, the pitch of the dots in the columns and/or rows is such that light wavelengths in a filtering range are attenuated by at least 40 percent, and preferably by at least 50 percent, or at least 60 percent, when the dots are in a first state, wherein the filtering range is comprised within the wavelength range of 900 nm to 1000 nm.

According to an embodiment, the filtering range is comprised within the wavelength range 920 nm to 960 nm.

According to an embodiment, the phase change filter is a notch filter, the notch of the notch filter is, for example, centered on a central frequency in the range 900 nm to 1000 nm, and preferably in the range 920 nm to 960 nm, the central frequency, for example, being equal to 940 nm, or around 940 nm.

According to an embodiment, light wavelengths in the filtering range are attenuated by less than 20 percent when the dots are in a second state.

According to an embodiment, the first state is an amorphous state, and the second state is a crystalline state.

According to an embodiment, the pitch of the dots in the columns and rows is such that light wavelengths in an offset filtering range are attenuated by at least 40 percent, and preferably by at least 50 percent or at least 60 percent, when the dots are in a second state, wherein the offset filtering range is for example non-overlapping with the filtering range.

According to an embodiment, the electrically conductive material of the heating layer comprises Indium Tin Oxide (ITO).

According to an embodiment, the material and thickness of the heating layer are chosen to be transparent to light in the filtering range, wherein transparent means an attenuation of 20 percent or less.

According to an embodiment, the heating layer has a thickness of between 10 nm and 40 nm, and preferably of around 20 nm.

According to an embodiment, each conductive finger has a lowest width in the plane of the heating layer in the range 50 nm to 150 nm, and preferably in the range 75 nm to 125 nm, for example in the range 85 nm to 115 nm, and for example equal to around 100 nm.

According to an embodiment, a gap between the fingers has a maximum width in the plane of the heating layer in the range 50 nm to 150 nm, and preferably in the range 75 nm to 125 nm, for example in the range 85 nm to 115 nm, and for example equal to around 100 nm.

According to an embodiment, a length of each of the fingers in the plane of the heating layer is of at least 250 nm, and preferably of at least 300 nm, for example of between 400 nm and 500 nm.

One embodiment also provides an image sensor comprising: a layer of light sensitive elements, such as photodiodes; a layer of color and/or infrared filters, such as a RGBZ filtering layer comprising R, G, B and Z filters; and a phase change filter, as previously defined, stacked with each color/infrared filter.

One embodiment also provides a method of fabricating a phase change filter, the method comprising: forming a heating layer of electrically conductive material, the heating layer comprising a plurality of heating zones, each heating zone comprising one or more conductive fingers; and forming a plurality of dots, each dot being formed of a phase change material, a corresponding one of the dots being positioned on each heating zone of the heating layer.

One embodiment also provides a method of fabricating a phase change filter, the method comprising: forming a plurality of dots, each dot being formed of a phase change material, wherein the dots are formed in columns and rows of regular spacing, the pitch of the dots in the columns and rows being in the range 500 nm to 1000 nm.

BRIEF DESCRIPTION OF THE DRAWINGS

The foregoing features and advantages, as well as others, will be described in detail in the following description of specific embodiments given by way of illustration and not limitation with reference to the accompanying drawings.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following description, "visible light" designates an electromagnetic radiation having a wavelength in the range 400 nm to 700 nm and "infrared radiation" (IR) designates an electromagnetic radiation having a wavelength in the range 700 nm to 1 mm. In infrared radiation, one can particularly distinguish near infrared radiation (NIR) having a wavelength in the range 700 nm to 1.4 µm. Further, in the following description, "useful radiation" designates the electromagnetic radiation crossing an optical system in operation and captured by a detector associated with the optical system.

In the remainder of the description, the internal transmittance of a layer corresponds to the ratio between the intensity of the radiation leaving the layer and the intensity of the radiation entering the layer, the rays of the incoming radiation being perpendicular to the layer. The absorption of the layer is equal to the difference between 1 and the internal transmittance. In the remainder of the description, a layer or a film is said to be transparent to radiation when the absorption of the radiation through the layer or the film is less than 20%. In the remainder of the description, the refractive index of a material corresponds to the refractive index of the material at the wavelength of the useful radiation.

Figure 1:
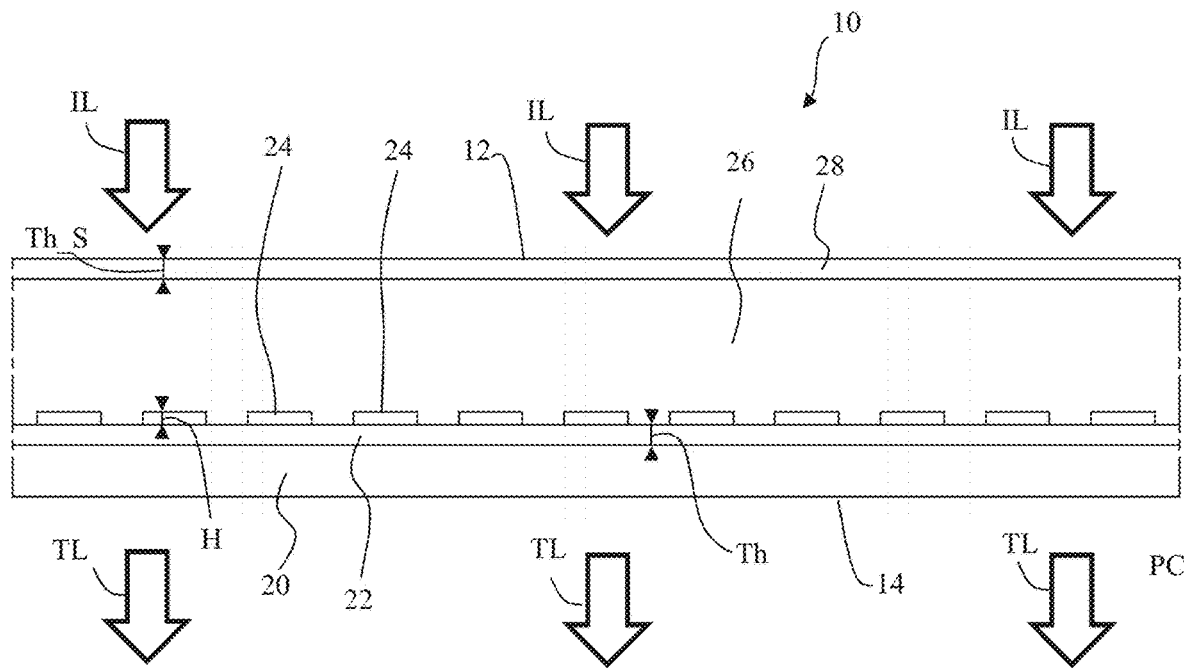
FIG. 1 is a partial simplified cross-section view of an embodiment of a programmable phase change filter.

FIG. 1 is a partial simplified cross-section view of an embodiment of a programmable phase change filter 10. In an embodiment, the programmable phase change filter 10 acts as an optical notch filter. The programmable phase change filter 10 comprises an upper face 12, receiving an incident electromagnetic radiation IL, and a lower face 14, opposite the upper face 12, and providing a transmitted electromagnetic radiation TL. Preferably, upper and lower faces 12, 14 are parallel. Preferably, upper and lower faces 12, 14 are planar.

The programmable phase change filter 10 comprises a stack comprising, from bottom to top in FIG. 1: a base layer 20 delimiting the lower face 14; a heating layer 22 resting on the base layer 20, preferably in physical contact with the base layer 20; phase change dots 24 resting on the heating layer 22, preferably in physical contact with the heating layer 22; an intermediate layer 26 covering the phase change dots 24 and the heating layer 22 between the phase change dots 24, preferably in physical contact with the phase change dots 24 and with the heating layer 22 between the phase change dots 24; a shield layer 28 delimiting the upper face 12 resting on the intermediate layer 26, preferably in physical contact with the intermediate layer 26.

The layer containing the phase change dots 24 and the portion of the intermediate layer 26 between the phase change dots 24 forms a photonic crystal PC.

Figure 2:
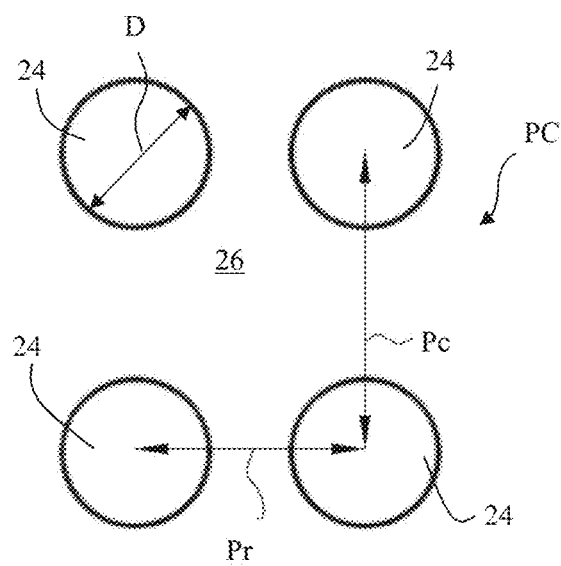
FIG. 2 shows an arrangement of phase change dots of a photonic crystal layer of the programmable phase change filter of FIG. 1.

FIG. 2 is an enlarged top view, partial and schematic, of an embodiment of the photonic crystal PC.

According to an embodiment, each phase change dot 24 has substantially a cylindrical shape or a truncated cone (frusto-conical) shape with a central axis perpendicular to upper face 12 over a height H, measured perpendicular to upper face 12, and with a base having an oval, circular, or polygonal shape, particularly triangular, rectangular, square, or hexagonal, preferably having a circular shape. The term "average diameter" used in relation with the base of the phase change dot 24 designates a quantity associated with the surface area of the base, for example corresponding to the diameter of the disk having the same surface area as the base. The average diameter D of each phase change dot 24 is in the range 50 nm to 1500 nm, preferably 100 nm to 300 nm. The height H of each phase change dot 24 is in the range 20 nm to 300 nm, preferably 60 nm to 150 nm.

The phase change dots 24 rest on the heating layer 22, at a distance from each other. According to an embodiment, the phase change dots 24 are regularly arranged on the heating layer 22, for example according to an array. In FIG. 2, the phase change dots 24 are arranged in a rectangle network. This means that the phase change dots 24 are arranged in rows and columns, the centers of the phase change dots 24 being at the vertices of rectangles, two adjacent phase change dots 24 of the same row being separated by a row pitch Pr and two adjacent phase change dots 24 of the same column being separated by a column pitch Pc. According to another embodiment, the phase change dots 24 are arranged in a hexagonal network. This means that the phase change dots 24 are, in a top view, arranged in rows, the centers of the phase change dots 24 being at the vertices of equilateral triangles, the centers of two adjacent phase change dots 24 of the same row being separated by the row pitch Pr and the centers of the phase change dots 24 of two adjacent rows being offset by the distance Pr/2 in the direction of the rows. The pitch Pr between two adjacent phase change dots 24 in a row is in the range 500 nm to 1000 nm. According to one embodiment, the pitch Pr between each phase change dot 24 and the nearest phase change dot 24 in a row is substantially constant. The pitch Pc between two adjacent phase change dots 24 in a column is in the range 200 nm to 1000 nm. According to one embodiment, the pitch Pc between each phase change dot 24 and the nearest phase change dot 24 in a column is substantially constant. Pitches Pr and Pc can be equal.

Each phase change dot 24 is made of a phase change material that can undergo a solid/solid phase transition between first and second states by absorption or release of heat and that has a refraction index that is different in the first and second states. According to an embodiment, the first state is an amorphous state, and the second state is a crystalline state.

According to an embodiment, each phase change dot 24 is made of a phase change chalcogenide material, for example $Sb_2S_3$, $Sb_3Se_3$, GeTe, GeTeN, germanium-antimony-tellurium alloy (GeSbTe or GST), in particular $Ge_2Sb_2Te_5$, or a phase change vanadium oxide, in particular $VO_2$. According to an embodiment, the phase change temperature of each phase change dot 24 is in the range 500 K to 1100 K for phase change chalcogenide materials and 350 K to 450 K for $VO_2$ type materials.

According to an embodiment, the intermediate layer 26 is made of an electrically insulating material. The intermediate layer 26 can have a monolayer structure or a multilayer structure. According to an embodiment, the intermediate layer 26 is made of a dielectric material, for example, of silicon oxide ($SiO_2$), of silicon nitride (SiN, or $Si_xN_y$, where x is approximately equal to 3 and y is approximately equal to 4, for example, $Si_3N_4$), of silicon oxynitride (particularly of general formula $SiO_xN_y$, for example, $Si_2ON_2$), of hafnium oxide ($HfO_2$), of aluminum oxide ($Al_2O_3$), or of amorphous silicon carbide (a-SiC). According to an embodiment, the thickness of the intermediate layer 26 is comprised between 0.1 µm and 10 µm, preferably between 0.2 µm and 0.6 µm.

According to an embodiment, light wavelengths in a filtering range are attenuated by the phase change filter 10 by at least 40 percent, and preferably by at least 50 percent, or at least 60 percent, when the phase change dots 24 are in the first state and light wavelengths in the filtering range are attenuated by less than 20 percent when the phase change dots 24 are in the second state. The filtering range is comprised within the wavelength range of 900 nm to 1000 nm, preferably within the wavelength range 920 nm to 960 nm. The phase change filter 10 is a notch filter, the notch of the notch filter, for example, being centered on a central frequency in the range 900 nm to 1000 nm, and preferably in the range 920 nm to 960 nm, the central frequency, for example, being equal to 940 nm, or around 940 nm.

Light wavelengths in an offset filtering range are attenuated by at least 40 percent, and preferably by at least 50 percent or at least 60 percent, when the dots are in a second state, wherein the offset filtering range is, for example, non-overlapping with the filtering range.

Each of the base layer 20, the heating layer 22, the phase change dots 24, the intermediate layer 26 and the shield layer 28 is transparent to the incident radiation IL in the filtering range.

Figure 3:
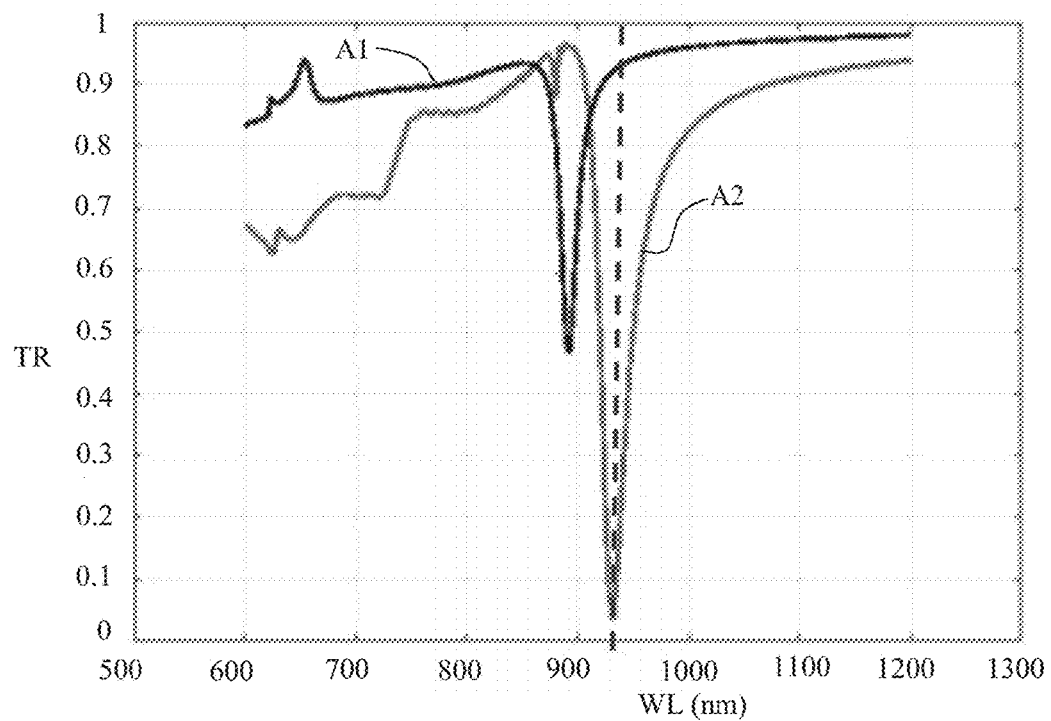
FIG. 3 shows curves of the evolution of the transmittance of the photonic crystal of the programmable phase change filter of FIG. 1 as a function of the wavelength of the incident radiation.

FIG. 3 represents curves A1 and A2 of the evolution of the transmittance TR of the photonic crystal PC of the programmable phase change filter 10 as a function of the wavelength WL of the incident radiation for two temperatures. For the curves shown in FIG. 2, the phase change dots 24 were made of $Sb_2S_3$ and were separated by $SiO_2$. Each phase change dot 24 was a cylinder having a height H equal to 50 nm and having a circular base with a diameter of 200 nm. Pitches Pr and Pc were equal to 600 nm. The obtained photonic crystal PC acts as a notch filter cutting the radiation at the wavelength inferior to 900 nm (curve A1) when the Phase Change Material ($Sb_2S_3$ here) is in amorphous state, and cutting the radiation at the wavelength equal to 940 nm (curve A2) when the Phase Change Material ($Sb_2S_3$ here) is in crystalline state.

Figure 4:
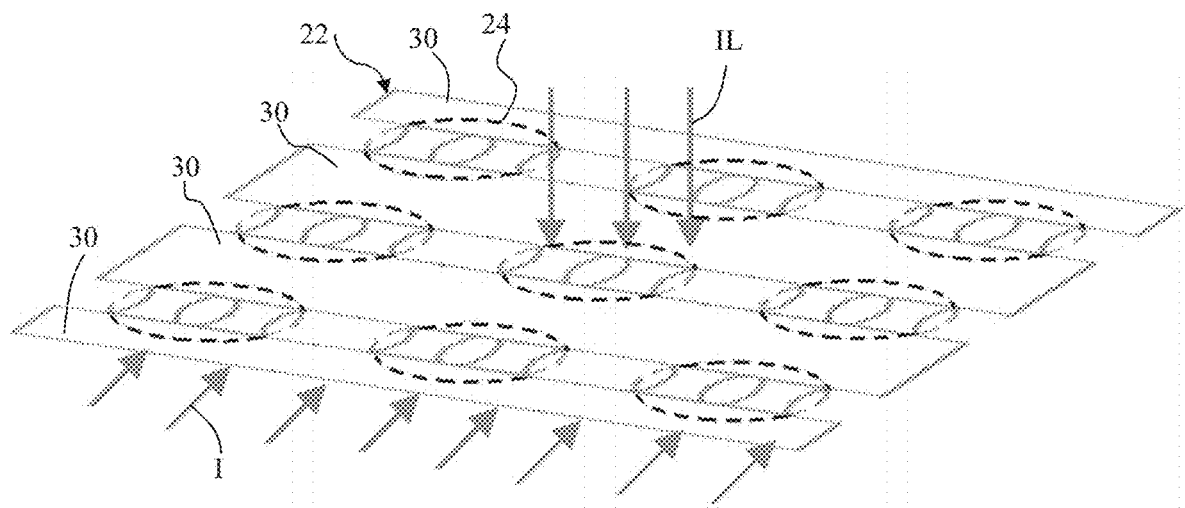
FIG. 4 is a simplified perspective view of an embodiment of a heating layer and phase change dots of the phase change filter of FIG. 1.
Figure 5:
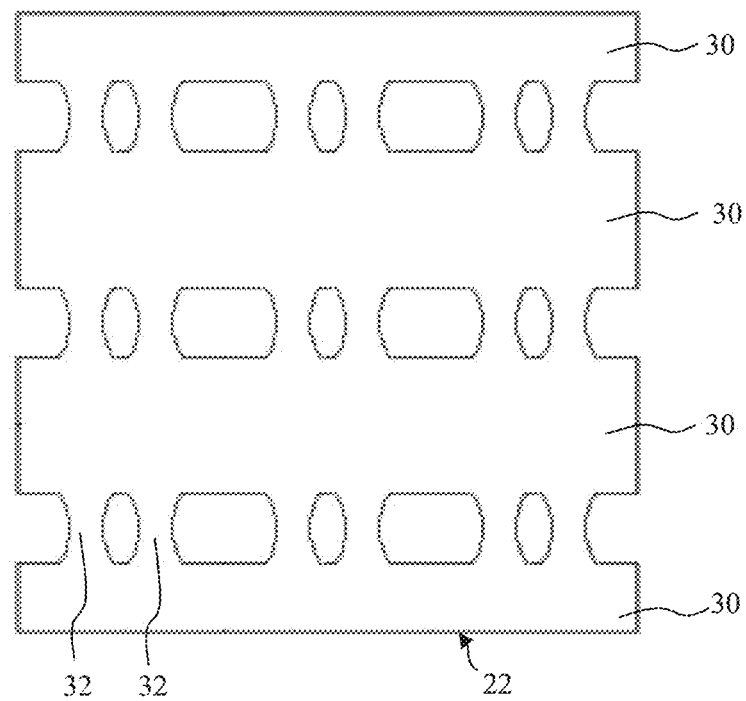
FIG. 5 is a bottom view of the heating layer of the phase change filter of FIG. 4.
Figure 6:
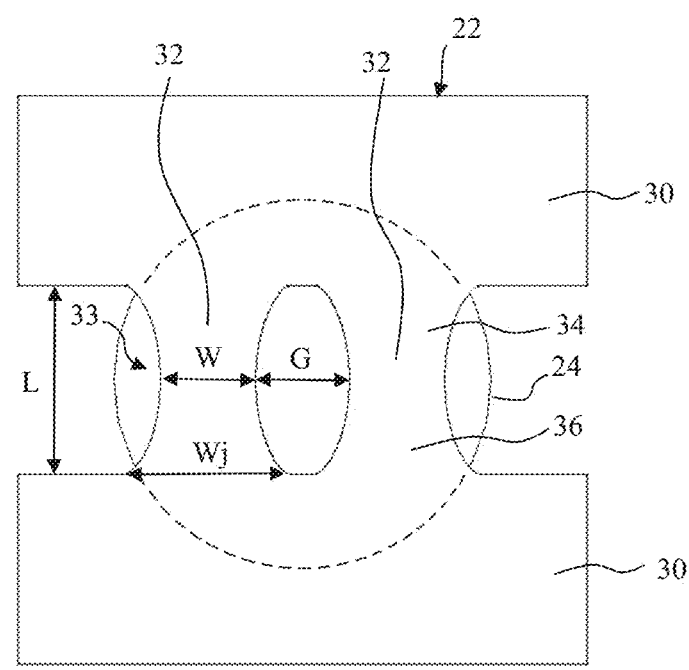
FIG. 6 is a detail bottom view of a part of the heating layer and the associated phase change dot of the phase change filter of FIG. 4.
Figure 7:
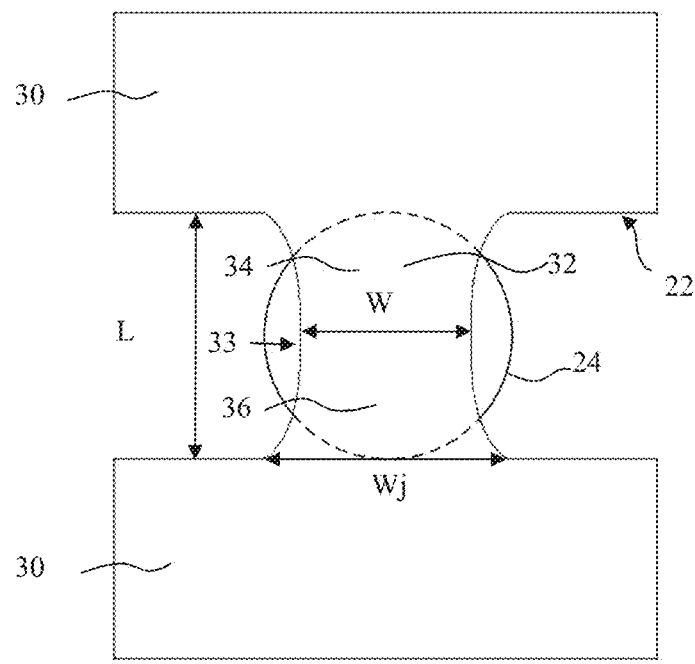
FIG. 7 is a detail bottom view of a part of another embodiment of the heating layer and the associated phase change dot of the phase change filter of FIG. 1.

FIG. 4 is a simplified perspective view of the heating layer 22, shown in full lines, and the phase change dots 24, shown in dotted lines. FIG. 5 is a bottom view of the heating layer 22. FIG. 6 is a detail bottom view of a part of the heating layer 22 of FIG. 5 and the associated phase change dot 24. FIG. 7, similar to FIG. 6, shows another embodiment of the heating layer 22.

The heating layer 22 comprises stripes 30, with adjacent stripes being connected by fingers 32, four stripes 30 being partially shown in FIGS. 4 and 5. According to an embodiment, when the phase change dots 24 are arranged in rows and columns, the stripes 30 can extend substantially parallel. FIG. 4 illustrates the direction of the current I through the heating layer 22.

Two adjacent stripes 30 are connected by several fingers 32. Each phase change dot 24 rests on at least one finger 32 and possibly partly on the stripes 30 connected by this finger 32. In the embodiment shown in FIGS. 4, 5 and 6, each phase change dot 24 rests on two fingers 32, in physical contact with the upper face of each of the two fingers 32. In this embodiment, each pair of adjacent fingers 32 forms a heating zone 33. In FIG. 6, each phase change dot 24 also rests partly on the stripes 30 connected by these two fingers 32. As a variation, each phase change dot 24 may rest only on the two fingers and not on the stripes connected by these two fingers 32. In the embodiment shown in FIG. 7, each phase change dot 24 rests on one finger 32 in physical contact with the upper face of the finger 32. In this embodiment, each finger 32 forms a heating zone 33. In FIG. 7, each phase change dot 24 does not rest partly on the stripes 30 connected by the finger 32. As a variation, each phase change dot 24 may also rest partly on the stripes connected by the finger 32.

According to an embodiment, each finger 32 connected to two adjacent stripes 30 comprises two flared portions 34, 36 connecting to each other on the least wide end and each connected to the one of the stripes 30 one the widest end. According to an embodiment, the length L of each finger 32, that is the distance between two adjacent stripes 30 at the level of the finger 32, in the plane of the heating layer 22, is of at least 250 nm, and preferably of at least 300 nm, for example of between 400 nm and 500 nm. According to an embodiment, the width of each stripe 30, except possibly from the two stripes 30 forming two opposite sides of the heating layer 22, is in the range 50 nm to 200 nm. The gap G between the fingers 32 and the space between the stripes 30 can be filled with the intermediate layer 26. The gap G between the fingers 32 has a maximum width in the plane of the heating layer 22 in the range 50 nm to 150 nm, and preferably in the range 75 nm to 125 nm, for example in the range 85 nm to 115 nm, and for example equal to around 100 nm. The width Wj of the finger 32 at the junction of the finger 32 to the stripe 30 is in the range 50 nm to 200 nm. The smallest width W of the finger 32 is in the range 50 nm to 150 nm, and preferably in the range 75 nm to 125 nm, for example in the range 85 nm to 115 nm, and for example equal to around 100 nm. The smallest width W of the finger 32 is called width W of the finger 32 in the remainder of the specification.

In the embodiment in which each phase change dot 24 rests on a pair of adjacent fingers 32, the smallest distance between the fingers of pair of adjacent fingers 32 is in the range 20 nm to 200 nm. In the embodiment in which each phase change dot 24 rests on a pair of adjacent fingers 32, the smallest distance between the fingers 32 of two adjacent pairs of fingers 32 is in the range 200 nm to 600 nm. It is to be noted that the dimensions are given for a notch filter cutting a radiation at about 940 nm but the structures can have different dimensions (from 100 nm to 1 µm) if a notch filter cutting a radiation in the visible or in the short-wave infrared is to be obtained.

The heating layer 22 is made of good thermally conductive material. According to an embodiment, the heating layer 22 is made of an electrically conductive material. According to an embodiment, the heating layer 22 is made of a transparent and conductive material such as indium tin oxide (ITO), zinc oxide, doped or not with aluminum or gallium, or graphene. According to an embodiment, the thickness Th of the heating layer 22 is comprised between 10 nm and 40 nm, and preferably of around 20 nm.

According to an embodiment, the base layer 20 is made of an electrically insulating material or a semiconductor material. The base layer 20 can have a monolayer structure or a multilayer structure. According to an embodiment, the base layer 20 is made of silicon oxide ($SiO_2$). According to an embodiment, the thickness of the base layer 20 is comprised between 100 nm and 1 µm.

The shield layer 28 is made of a good thermally conductive material. According to an embodiment, the shield layer 28 is made of an electrically conductive material. According to an embodiment, the shield layer 28 is made of a transparent and conductive material such as indium tin oxide (ITO), zinc oxide, doped or not with aluminum or gallium, or graphene. According to an embodiment, the thickness Th_S of the shield layer 28 is in the range 30 nm to 200 nm, preferably in the range 50 nm to 80 nm. The shield layer 28 and the heating layer 22 may be made of the same material.

The heating layer 22 is used to supply heat by joule effect by flowing a current trough the fingers 32, according to the direction shown by arrows I on FIG. 4, so that a current of the same intensity flows through each finger 32.

Figure 8:
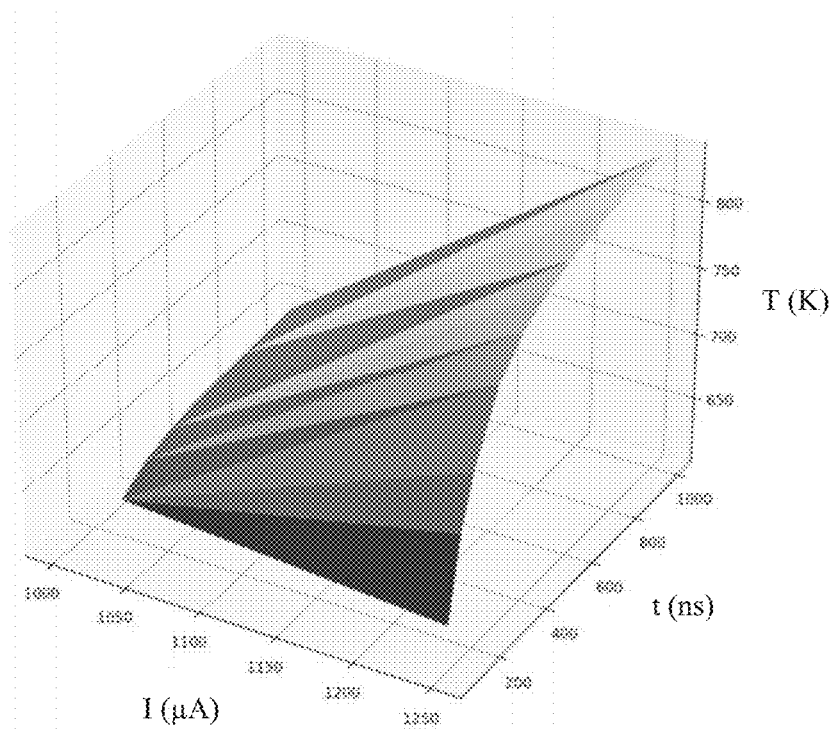
FIG. 8 shows the variation of the temperature provided by the heating layer having the structure shown in FIG. 7 with respect to the current flowing through the heating layer and time for a thickness of the heating layer.
Figure 9:
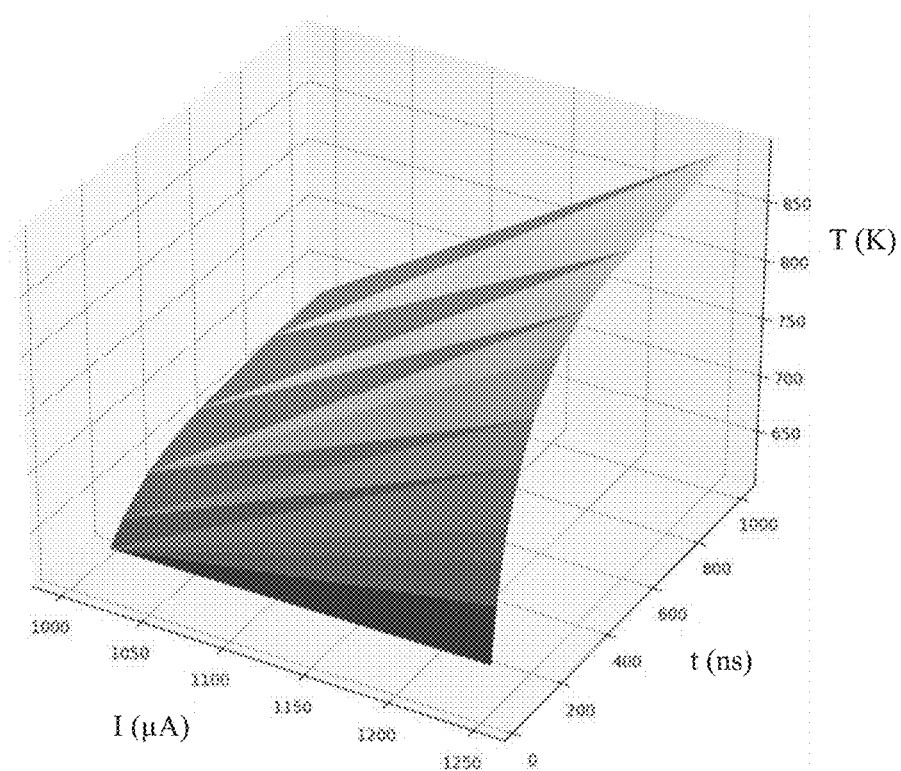
FIG. 9, similar to FIG. 8, shows the variation of the temperature for another thickness of the heating layer.

FIGS. 8 and 9 show the evolution, obtained by simulations, of the volume averaged temperature T on the face of the fingers 32 in contact with the phase change dots 24 with respect to the current intensity I flowing through each finger 32 and time t, for two thicknesses of the heating layer 22. For these simulations, the heating layer 22 had the structure shown in FIG. 7. The length L of each finger 32 was equal to 500 nm. The maximal width Wj of each finger 32 was equal to 400 nm. The width W of each finger 32 was equal to 100 nm. For FIG. 8, the thickness Th of the heating layer 22 was equal to 10 nm. For FIG. 9, the thickness of the heating layer 22 was equal to 15 nm. FIGS. 8 and 9 show that the temperature triggering the phase change of the phase change dots 24 can be provided by the heating layer 22.

Figure 10:
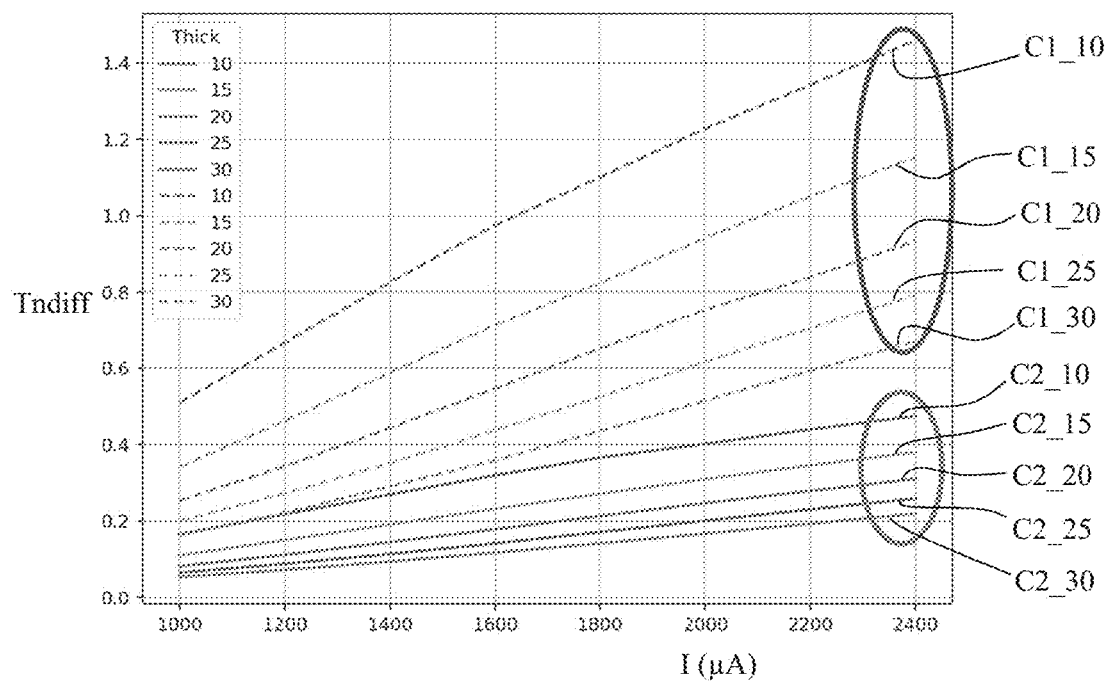
FIG. 10 shows curves of evolution of a ratio with respect to the current flowing through the heating layer for several thicknesses of the heating layer.

FIG. 10 shows curves C1_10, C1_15, C1_20, C1_25, C1_30, C2_10, C2_15, C2_20, C2_25, and C2_30 of evolution of the highest ratio Tndiff obtained in time with respect to the current I flowing through each finger 32 of heating layer 22 for several thicknesses of the heating layer 22, the ratio Tndiff being given by the following relation (1):

Tndiff=(Tavg−Tmin)/Tmin wherein Tavg is the average temperature in the phase change dot 24 et Tmin is the lowest temperature in the phase change dot 24. For curves C1_10, C1_15, C1_20, C1_25, and C1_30, the heating layer 22 had the structure shown in FIG. 7, that is with one finger 32 by phase change dot 24, and the same dimensions as those previously disclosed in relation with FIG. 8 except that the thickness Th was equal to 10 nm, 15 nm, 20 nm, 25 nm, and 30 nm respectively. For curves C2_10, C2_15, C2_20, C2_25, C2_30, the heating layer 22 had the structure shown in FIG. 6, that is with two fingers 32 by phase change dot 24, and the same dimensions as those previously disclosed in relation with FIG. 8 except that the thickness Th was equal to 10 nm, 15 nm, 20 nm, 25 nm, and 30 nm respectively. FIG. 10 shows that the variation of the temperature in the phase change dot 24 is reduced for the structure shown in FIG. 6, that is with two fingers 32 by phase change dot 24.

For FIGS. 11 to 20, the heating layer 22 had the structure shown in FIG. 6, that is with two fingers 32 by phase change dot 24, and the dimensions disclosed previously in relation to FIG. 10 unless otherwise indicated.

Figure 11:
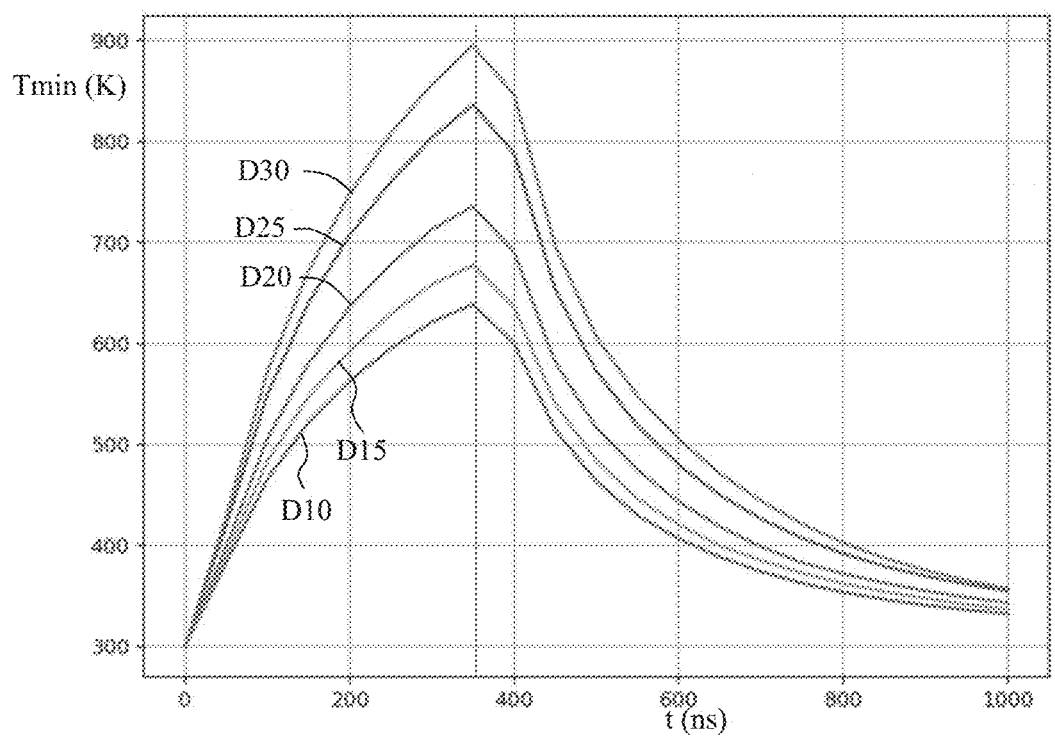
FIG. 11 shows curves of evolution of a minimum temperature with respect to time for several thicknesses of the heating layer.

FIG. 11 shows curves D10, D15, D20, D25, and D30 of evolution of the lowest temperature Tmin in the phase change dot 24 with respect to time t for several thicknesses of the heating layer 22. The current was supplied at t equal to 0 ns, and was stopped a time equal to 380 ns. Curve D10 was obtained for a thickness Th of 10 nm and a current intensity of 1000 µA, curve D15 was obtained for a thickness Th of 15 nm and a current intensity of 1300 µA, curve D20 was obtained for a thickness Th of 20 nm and a current intensity of 1600 µA, curve D25 was obtained for a thickness Th of 25 nm and a current intensity of 2000 µA, and curve D30 was obtained for a thickness Th of 30 nm and a current intensity of 2300 µA. This Figure shows that at time of 350 ns, a temperature adapted to trigger a phase change is obtained.

Figure 12:
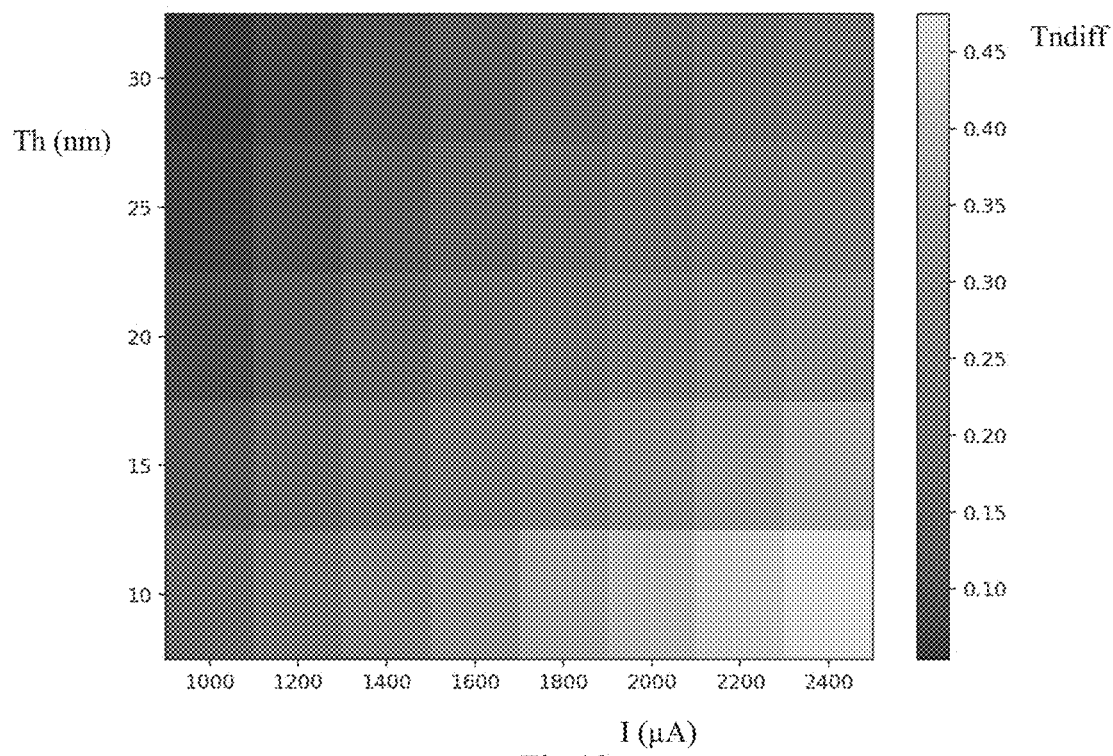
FIG. 12 shows the variation of the highest ratio with respect to the current intensity flowing through the heating layer and the thickness of the heating layer.

FIG. 12 shows the variation, obtained by simulations, of the highest ratio Tndiff obtained in time with respect to the current intensity I flowing through each finger 32 of the heating layer 22 and the thickness Th of the heating layer 22.

Figure 13:
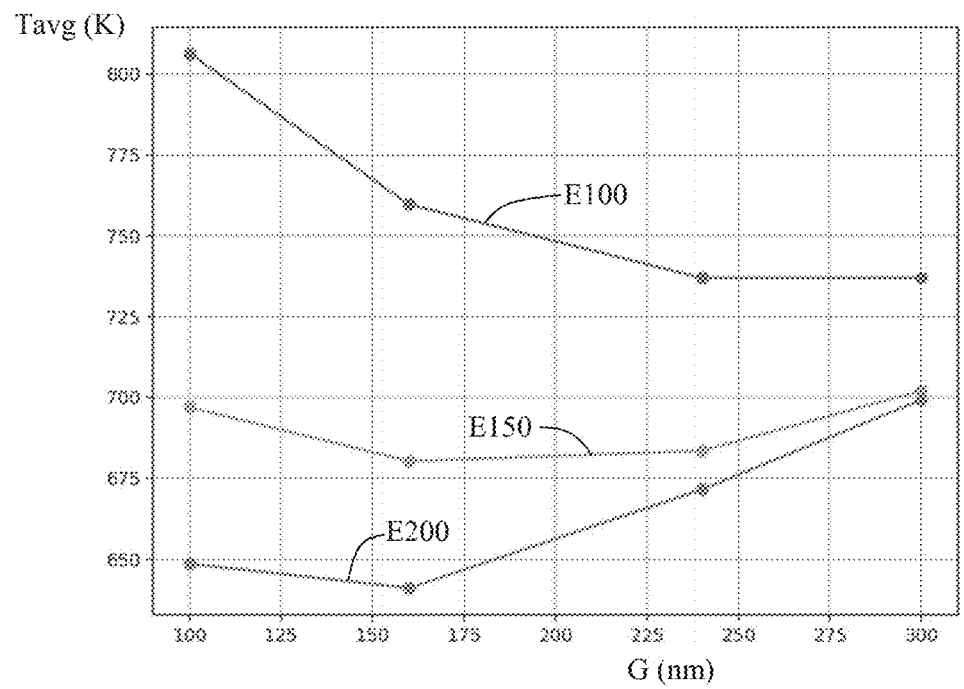
FIG. 13 shows curves of evolution of an average temperature with respect to the gap between the fingers of the heating layer for several widths of the fingers.
Figure 14:
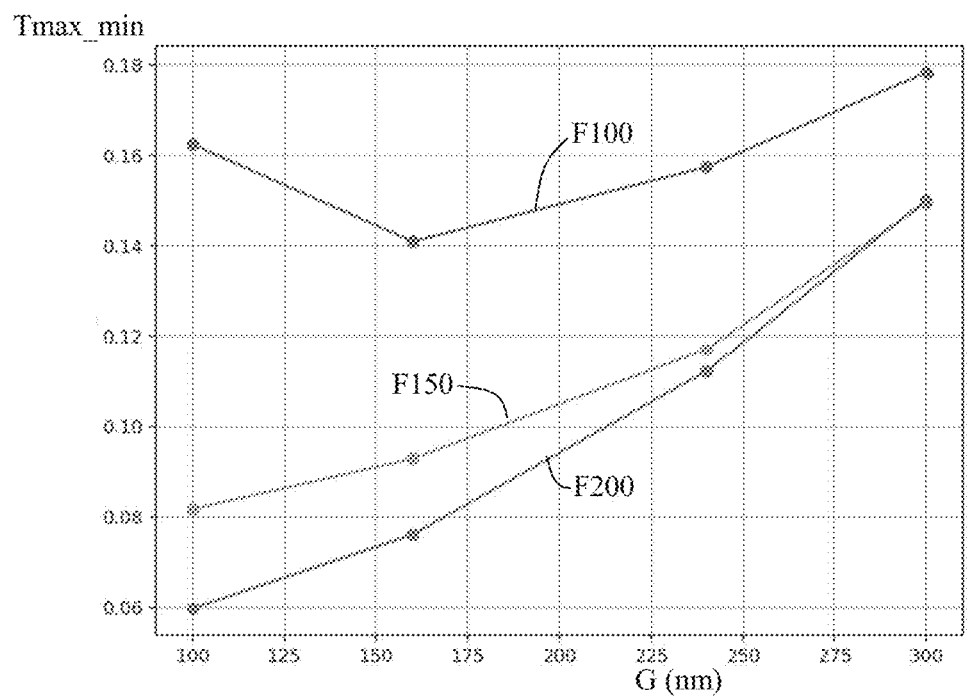
FIG. 14 shows curves of evolution of a ratio with respect to the gap between the fingers of the heating layer for several widths of the fingers.

For FIGS. 13 and 14, the current intensity flowing through each finger 32 of the heating layer 22 was equal to 1700 µA. The Figures were obtained at time equal to 350 ns.

FIG. 13 shows curves E100, E150, and E200 of evolution of the average temperature Tavg in the phase change dot 24 with respect to gap G for several widths W of the finger 32 of the heating layer 22. Curve E100 was obtained for a width W of 100 nm, curve E150 was obtained for a width W of 150 nm, and curve E200 was obtained for a width W of 150 nm. It is advantageous that the average temperature Tavg is the highest.

FIG. 14 shows curves F100, F150, and F200 of evolution of the ratio Tmax_min with respect to gap G for several widths of the fingers 32 of the heating layer 22. The ratio Tmax_min being given by the following relation (2):

Tmax_min=(Tmax−Tmin)/Tavg wherein Tmax is the highest temperature in the phase change dot 24. Curve F100 was obtained for a width W of 100 nm, curve F150 was obtained for a width W of 150 nm, and curve F200 was obtained for a width W of 150 nm. It is advantageous that the ratio Tmax_min is the lowest.

Figure 15:
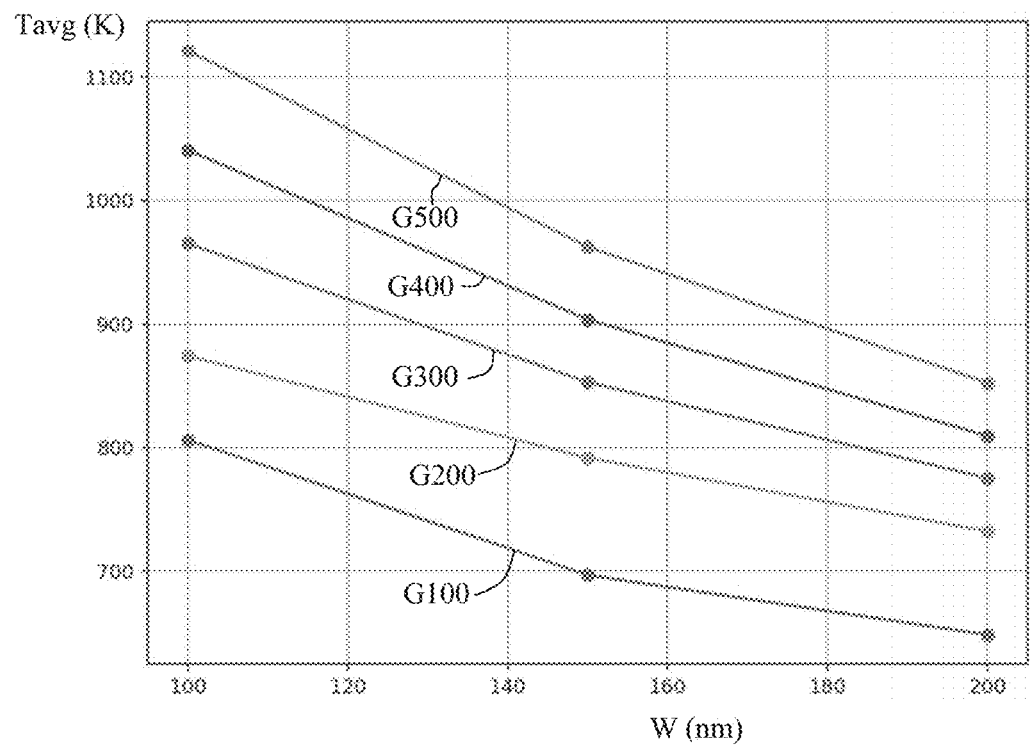
FIG. 15 shows curves of evolution of the average temperature with respect to the width of the fingers of the heating layer for several lengths of the fingers.
Figure 16:
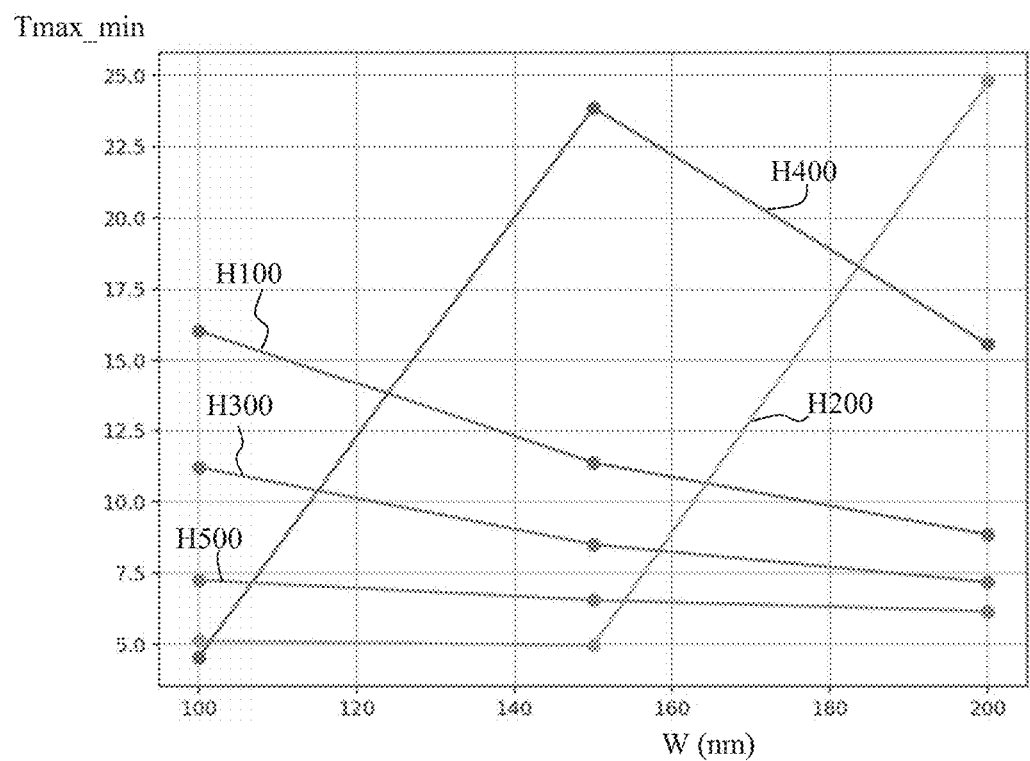
FIG. 16 shows curves of evolution of the ratio with respect to the width of the fingers of the heating layer for several lengths of the finger.

For FIGS. 15 and 16, the simulations were performed at time equal to 350 ns and the gap G was equal to 100 nm.

FIG. 15 shows curves G100, G200, G300, G400, and G500 of evolution of the average temperature Tavg in the phase change dot 24 with respect to the width W for several lengths L of the finger 32 of the heating layer 22. Curve G100, G200, G300, G400, and G500 were obtained for a length L of 100 nm, 200 nm, 300 nm, 400 nm and 500 nm respectively.

FIG. 16 shows curves H100, H200, H300, H400, and H500 of evolution of the ratio Tmax_min in the phase change dot 24 with respect to the width W for several lengths L of the finger 32 of the heating layer 22. Curve H100, H200, H300, H400, and H500 were obtained for a length L of 100 nm, 200 nm, 300 nm, 400 nm and 500 nm respectively.

Figure 17:
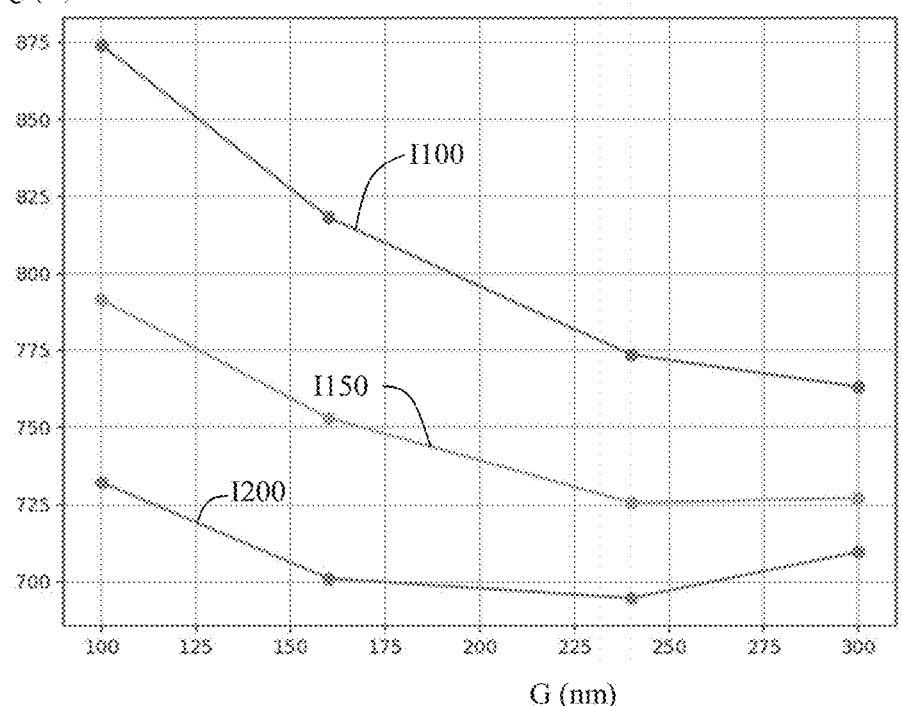
FIG. 17 shows curves of evolution of the average temperature with respect to the gap between the fingers of the heating layer for several widths of the fingers.
Figure 18:
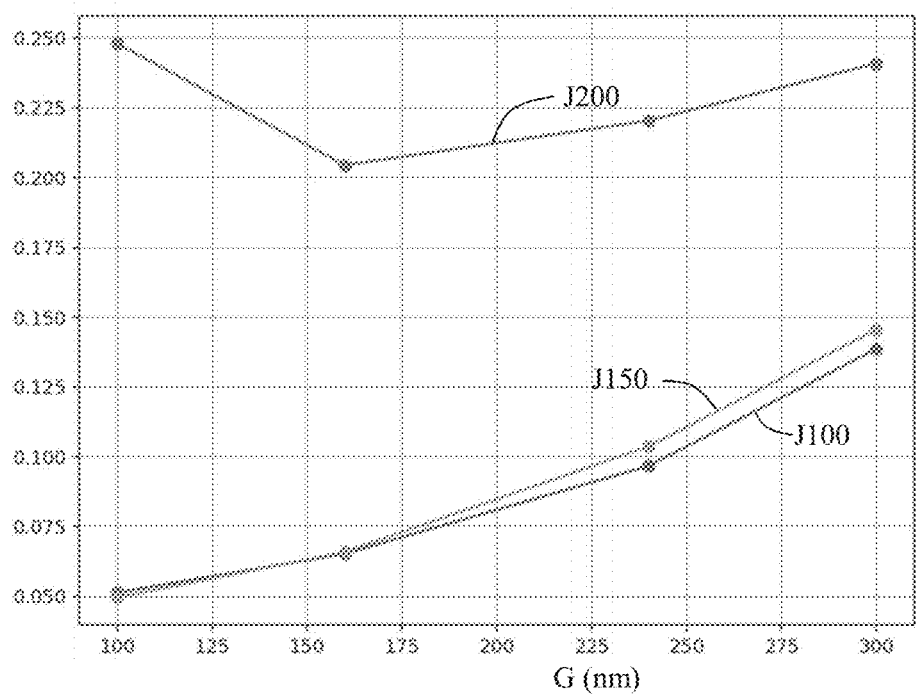
FIG. 18 shows curves of evolution of the ratio with respect to the gap between the fingers of the heating layer for several widths of the fingers.

For FIGS. 17 and 18, the simulations were performed at time equal to 350 ns and the length L was equal to 200 nm.

FIG. 17 shows curves 1100, 1150, and 1200 of evolution of the average temperature Tavg in the phase change dot 24 with respect to gap G for several widths W of the finger 32 of the heating layer 22. Curve 1100 was obtained for a width W of 100 nm, curve 1150 was obtained for a width W of 150 nm, and curve 1200 was obtained for a width W of 150 nm.

FIG. 18 shows curves J100, J150, and J200 of evolution of the average ratio Tmax_min in the phase change dot 24 with respect to gap G for several widths of the finger 32 of the heating layer 22. Curve J100 was obtained for a width W of 100 nm, curve J150 was obtained for a width W of 150 nm, and curve J200 was obtained for a width W of 150 nm.

Figure 19:
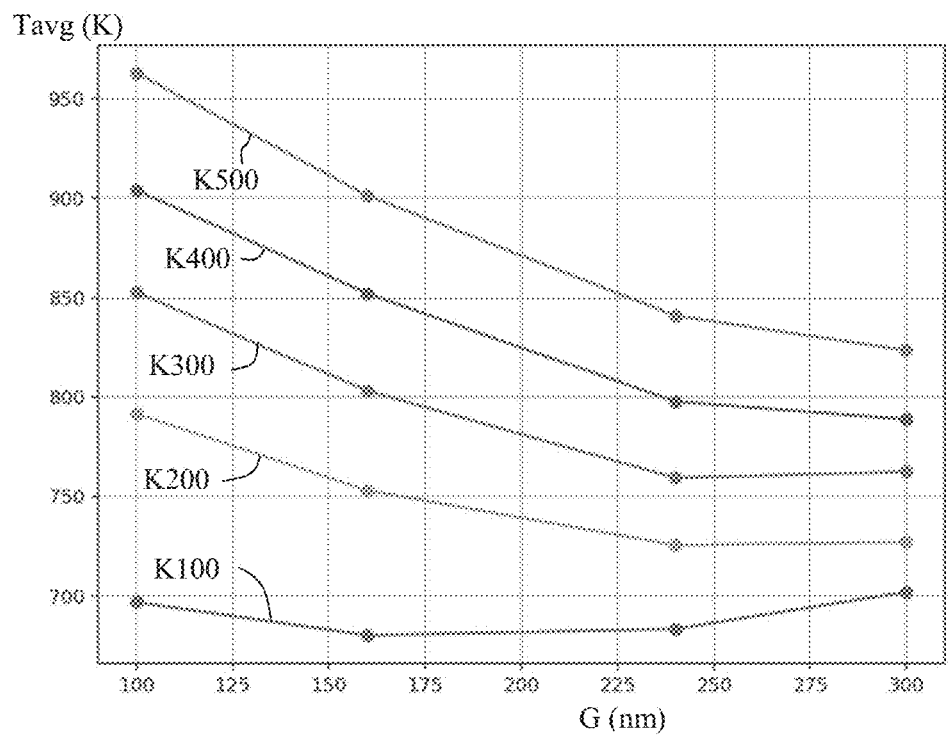
FIG. 19 shows curves of evolution of the average temperature with respect to the gap between the fingers of the heating layer for several lengths of the fingers.
Figure 20:
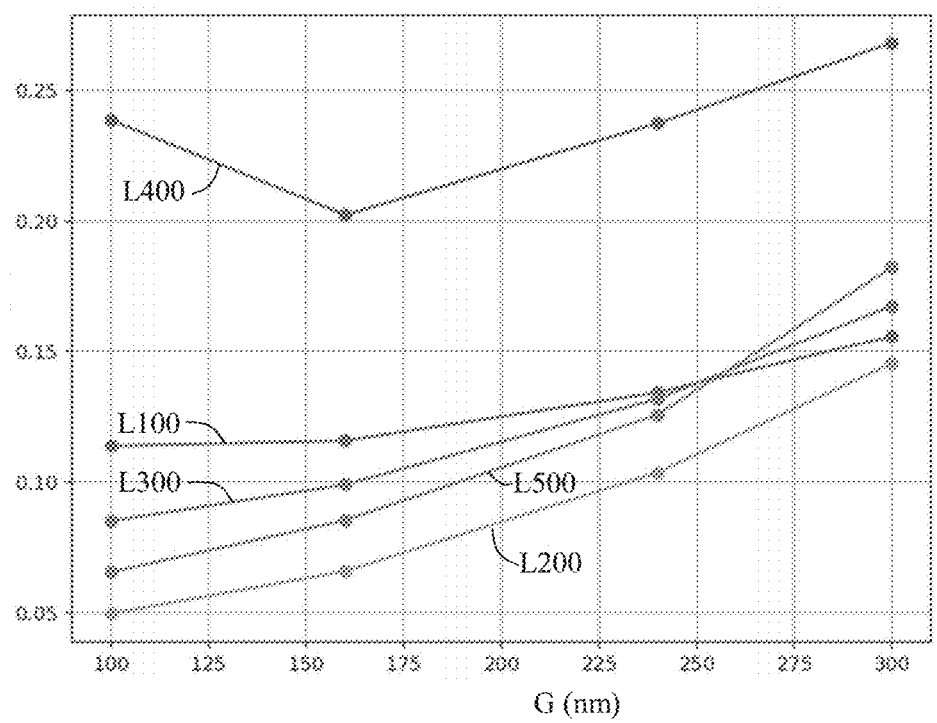
FIG. 20 shows curves of evolution of the ratio with respect to the gap between the fingers of the heating layer for several lengths of the fingers.

For FIGS. 19 and 20, the simulations were performed at time equal to 350 ns and the width W was equal to 150 nm.

FIG. 19 shows curves K100, K200, K300, K400, and K500 of evolution of the average temperature Tavg in the phase change dot 24 with respect to the gap G for several lengths L of the finger 32 of the heating layer 22. Curve K100, K200, K300, K400, and K500 were obtained for a length L of 100 nm, 200 nm, 300 nm, 400 nm and 500 nm respectively.

FIG. 20 shows curves L100, L200, L300, L400, and L500 of evolution of the ratio Tmax_min in the phase change dot 24 with respect to the gap G for several lengths L of the finger 32 of the heating layer 22. Curve L100, L200, L300, L400, and L500 were obtained for a length L of 100 nm, 200 nm, 300 nm, 400 nm and 500 nm respectively.

Figure 21:
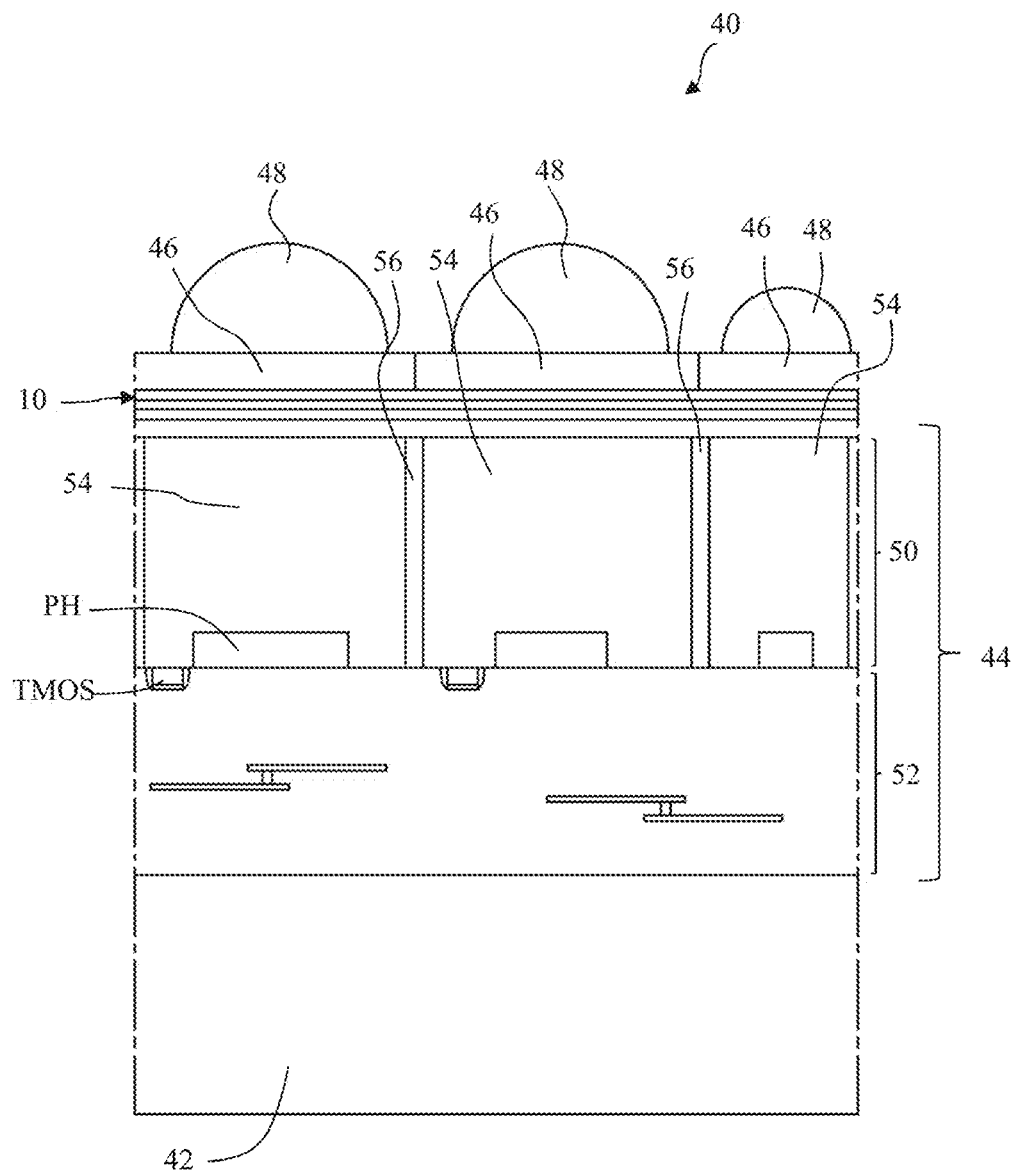
FIG. 21 is a partial simplified cross-section view of an embodiment of an image sensor.

FIG. 21 is a partial simplified cross-section view of an embodiment of an image sensor 40. The image sensor 40 comprises RGBZ pixels.

The image sensor 40 comprises a stack comprising, from bottom to top in FIG. 21: a support 42; an image sensor circuit 44; the programmable phase change filter 10; for each pixel, a color/infrared filter 46; and for each pixel, a lens 48.

The image sensor circuit 44 comprises a semiconductor substrate 50 and stack 52 of interconnection layers, the stack 52 of interconnection layers being located on the side of the support 42. The semiconductor substrate 50 is separated in semiconductor portions 54 by insulating walls 56, each semiconductor portion 54 being covered by a color/infrared filter 46 and a lens 48. Each semiconductor portion 54 may comprise a light sensitive element, for example a photodiode PH. Transistors TMOS can be formed in the substrate 50 and on the substrate 50. The image sensor 40 can also comprise an interferometry filter, not shown. Each color filter 46 selectively allows a single color to pass and is transparent to IR. The color filters 46 and the lenses 48 may be made of an organic material, for example a polymer.

The programmable phase change filter 10 covers all the semiconductor portions 54 and acts as an all-pass filter filtering only a given wavelength, preferably IR or NIR. The shift of the target filtering window in wavelength can be induced by applying voltage/current in the heater layer 22 of the programmable phase change filter 10 to allow to filter or let the target wavelength window pass.

Image sensor 40 may be a RGBZ sensor, in particular one using Time of Flight (ToF) technology. Known RGBZ technology was limited by light filtering and the inability of pixel stacking. Indeed, it was not possible to do voluntarily IR sensing or visible light sensing on the same x,y array location, that is to say on the same pixel, as visible pixels are polluted by IR radiation. Moreover, in known RGBZ image sensors, stacking an only-IR sensitive pixel to only-visible sensitive pixel requires extremely complex integration with the most promising on-paper solution requiring 3D heterogeneous integration of III-V IR pixels stacked on Si visible-only sensitive pixels.

The phase change filter 10 of the image sensor 40 allows to do IR sensing or visible light sensing on the same x,y array location, that is to say the same pixel, since the phase change filter 10 may be controlled to filter IR radiation so that visible pixels are not polluted by IR radiation. The phase change filter 10 is formed on all the pixels of the image sensor 40 so that no complex integration is required. The image sensor 40 may use a single standard Si pixel for both visible and IR sensing.

The heating layer 22 allows to induce phase change while maintaining low current consumption and high packing factor. The heating layer 22 of the phase change filter 10 is optimized to obtain a target temperature, while minimizing temperature non-uniformity in the phase change dots 24. The shield layer 28 of the phase change filter 10 also allows for thermal management of the environment of the phase change filter 10 in order to dissociate beneficial high local temperature from overall pixel-array detrimental overheating, in particular to obtain a thermal localization heat front control in order to protect organic optics.

For FIGS. 22 to 25, the heating layer 22 had the structure shown in FIG. 6, that is with two fingers 32 by phase change dot 24, and the gap G and the width W were both equal to 100 nm and the length was equal to 200 nm. The temperature outside of the image sensor 40 was equal to 300 K.

Figure 22:
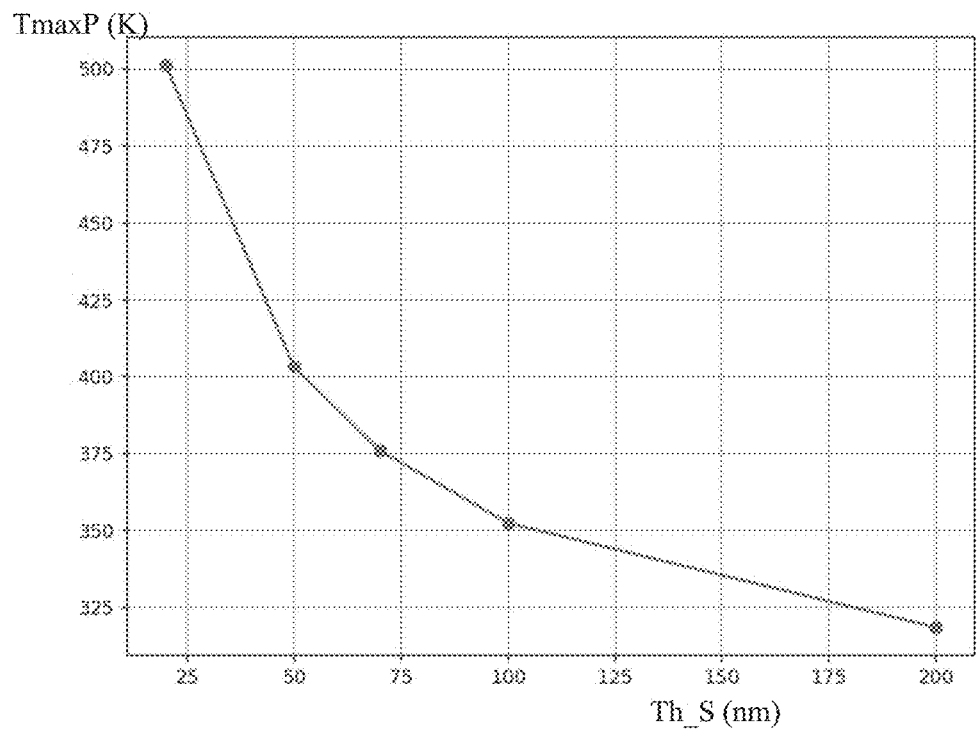
FIG. 22 shows the evolution of the maximal temperature in a layer made of an organic coating covering the shield layer of the phase change filter with respect to the thickness of the shield layer.

FIG. 22 shows the evolution of the maximal temperature TmasP in a color filter 46 corresponding to a layer made of poly(methyl methacrylate) (PMMA) covering the shield layer 28 with respect to the thickness Th_S of the shield layer 28. FIG. 22 shows that the shield layer 28 prevents a rise of temperature in the color filter 46.

Figure 23:
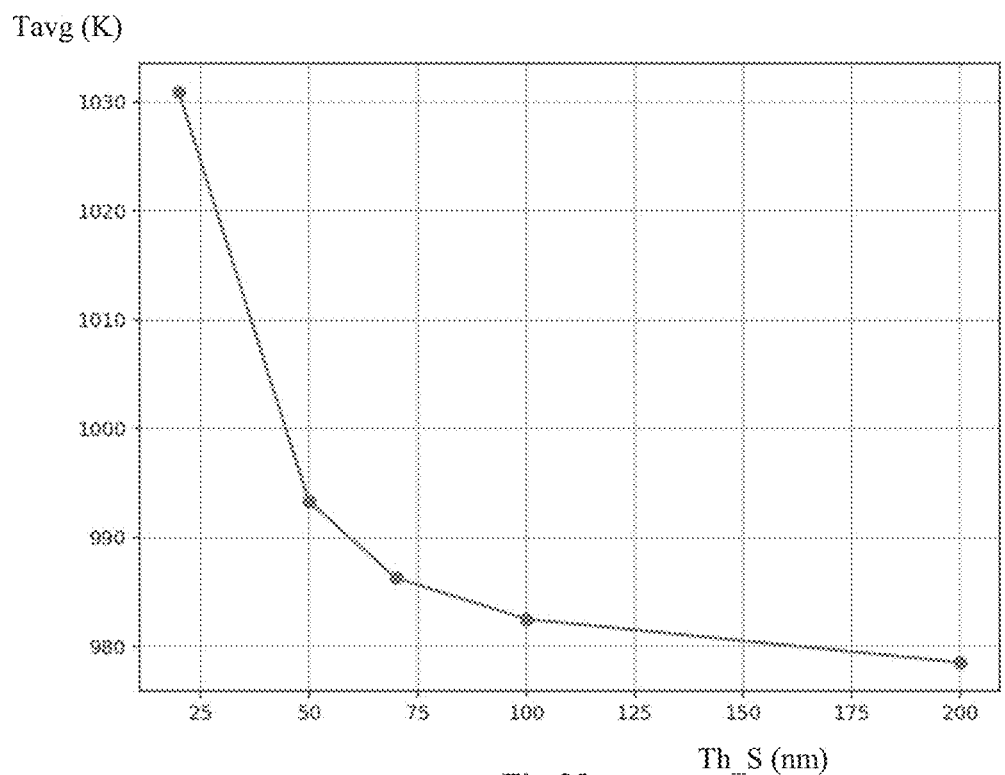
FIG. 23 shows the evolution of the average temperature in the phase change dot with respect to the thickness of the shield layer.

FIG. 23 shows the evolution of the average temperature Tavg in the phase change dot 24 with respect to the thickness Th_S of the shield layer 28. FIG. 23 shows that the shield layer 28 allows the heat front to be localized in the phase change dot 24.

Figure 24:
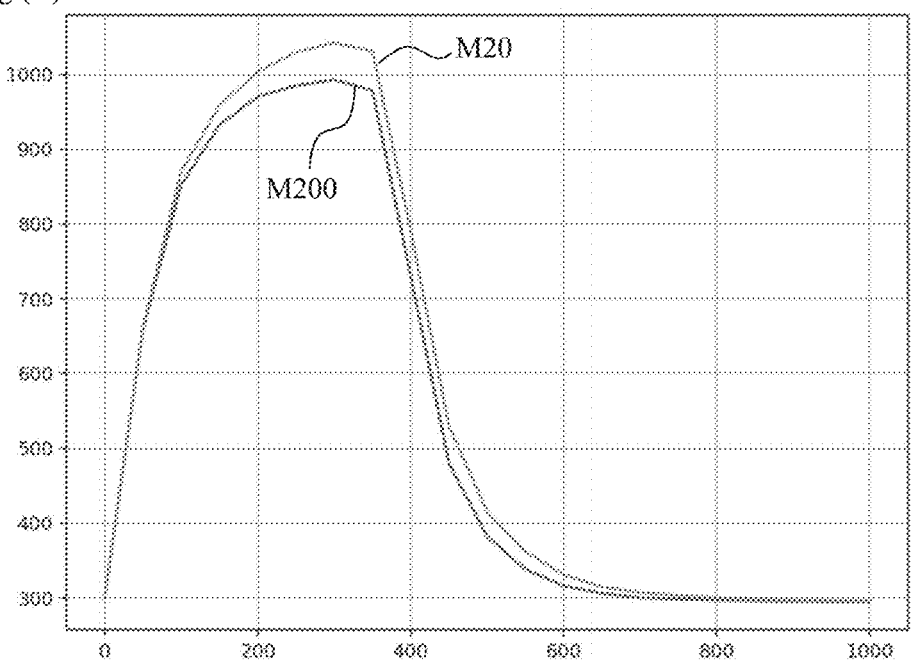
FIG. 24 shows curves of evolution of the average temperature with respect to time for two thicknesses of the shield layer.

FIG. 24 shows curves M20, and M200 of evolution of the average temperature Tavg in the phase change dot 24 with respect to time t for two thicknesses of the shield layer 28. Curve M20 was obtained for a thickness Th_S of 20 nm for the shield layer 28, and curve M200 was obtained for a thickness Th_S of 200 nm for the shield layer 28.

Figure 25:
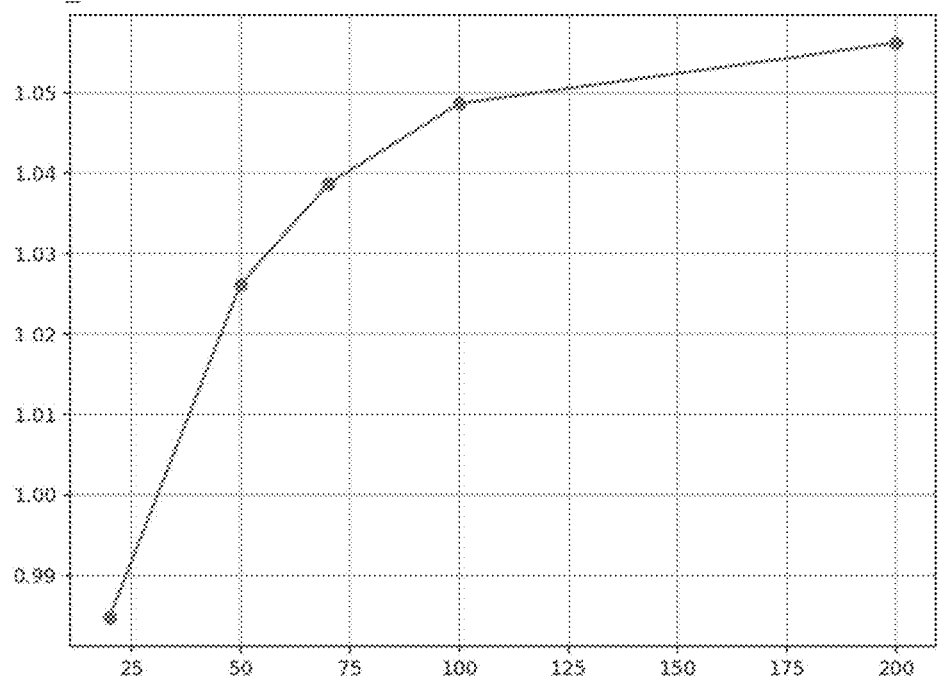
FIG. 25 shows the evolution of the ratio with respect to the thickness of the shield layer.

FIG. 25 shows the evolution of the ratio Tmax_min in the phase change dot 24 with respect to the thickness Th_S of the shield layer 28.

Figure 26:
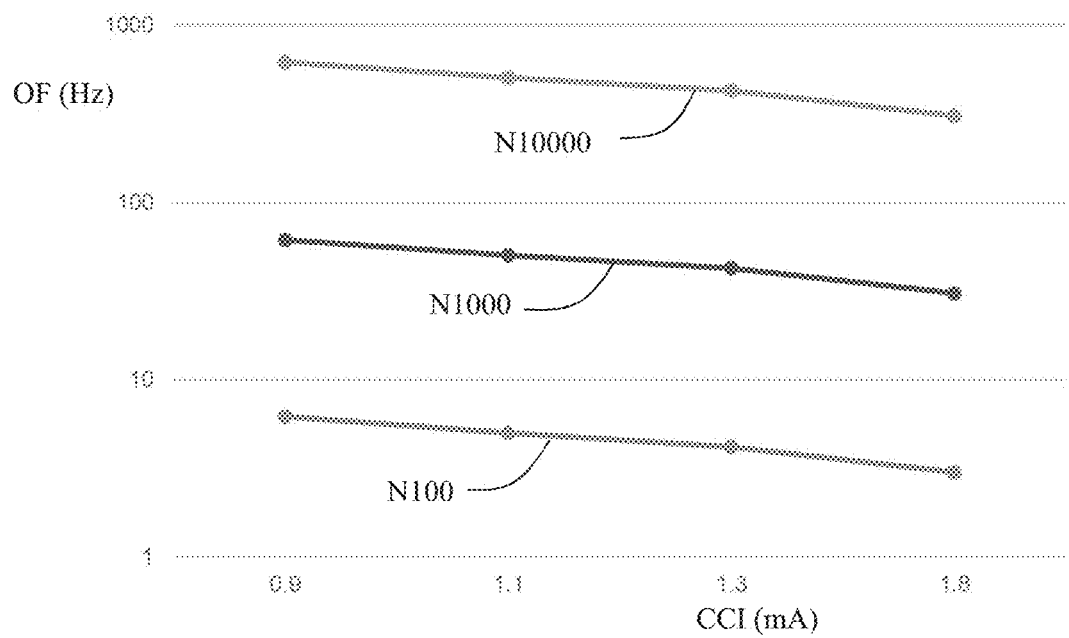
FIG. 26 shows curves of evolution of the operating frequency with respect to the cell current intensity.

FIG. 26 shows curves N100, N1000, and N10000 of evolution of the operating frequency OF with respect to the cell current intensity CCI (mA). FIG. 26 was obtained for an image sensor 40 comprising an array of $10^7$ cells.

Figure 27:
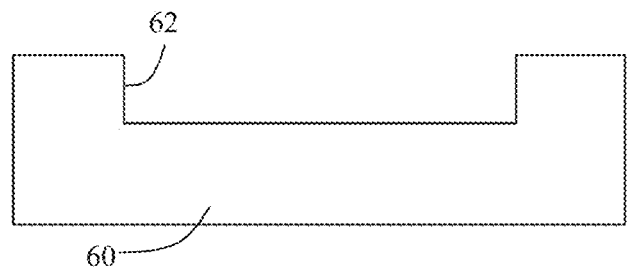
FIGS. 27-30 show the structure obtained at each step of an embodiment of a method for manufacturing the phase change filter of FIG. 1.

FIGS. 27 to 30 are sectional, partial and schematic views of the structures obtained in successive steps of an embodiment of a method for manufacturing the programmable phase change filter 10. The method comprises the following successive steps:

FIG. 27: etching of an opening 52 in a substrate 50. The substrate 50 may correspond to the base layer 22 previously disclosed and may correspond to the semiconductor substrate 52 or to an oxide layer covering the semiconductor substrate 52.

Figure 28:
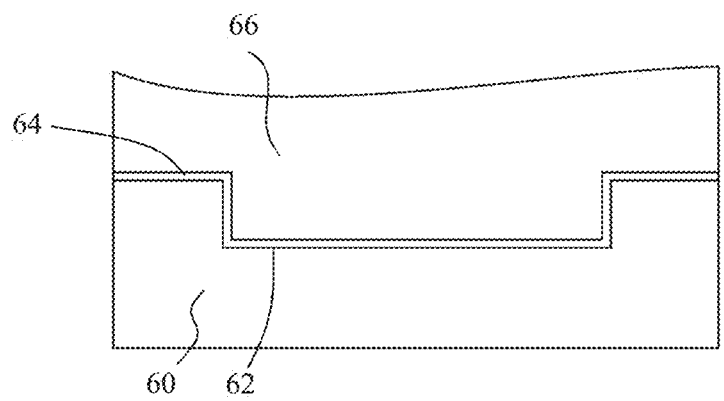

FIG. 28: deposition of a thin layer 54 on the substrate 50 and the deposition of a layer 56 of the material of the heating layer 22 in order to completely fill the opening 62. The layer 54 may act as an etch stop layer.

Figure 29:
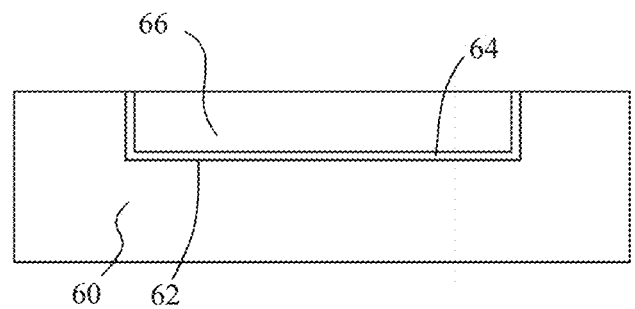

FIG. 29: etching of the layer 56 up to the upper face of the substrate 50 outside of the opening 52. The heating layer 22 is then obtained.

Figure 30:
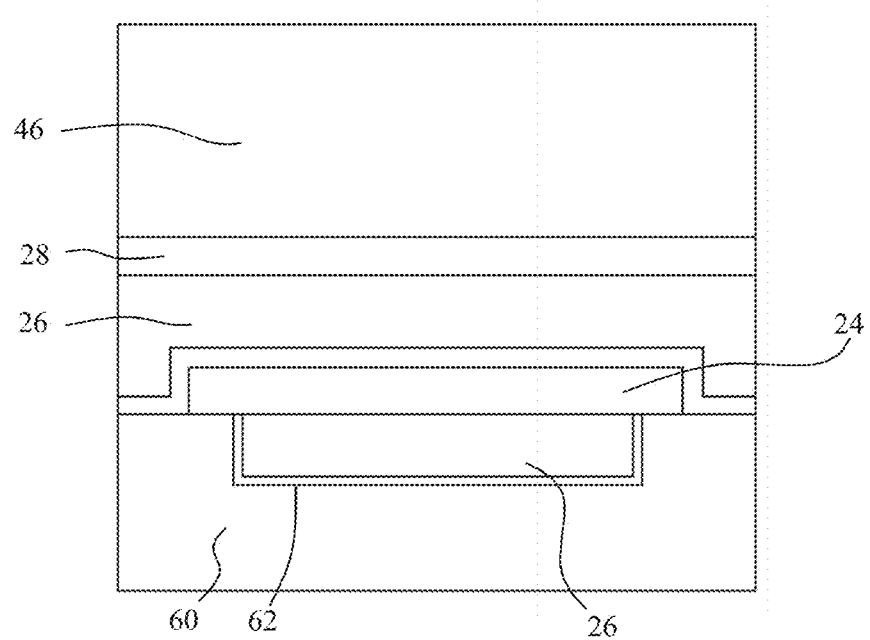

FIG. 30: formation of the phase change dots 24, the intermediate layer 26, the shield layer 28, and the color filter 46.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A phase change filter, comprising:
    a plurality of phase change material dots; and
    a heating layer of electrically conductive material;
    wherein the heating layer comprises a plurality of heating zones, each heating zone comprising one or more conductive fingers; and
    wherein a phase change material dot of said plurality of phase change material dots is positioned on each heating zone of the heating layer.

2. The phase change filter of claim 1, wherein said one or more conductive fingers comprises two conductive fingers in each heating zone of the heating layer.

3. The phase change filter of claim 1, wherein the phase change material dots are arranged in columns and rows of regular spacing.

4. The phase change filter of claim 3, wherein a pitch of the phase change material dots in one or more of the columns and rows is in a range of 500 nm to 1000 nm.

5. The phase change filter of claim 3, wherein a pitch of the phase change material dots in one or more of the columns and rows is such that light wavelengths in a filtering range are attenuated by at least 40 percent to 60 percent when the phase change material dots are in a first state, wherein the filtering range comprises a wavelength range of 900 nm to 1000 nm.

6. The phase change filter of claim 3, wherein a pitch of the phase change material dots in one or more of the columns and rows is such that light wavelengths in a filtering range are attenuated by at least 40 percent to 60 percent when the phase change material dots are in a first state, wherein the filtering range is comprised within the wavelength range of 920 nm to 960 nm.

7. The phase change filter of claim 3, wherein a pitch of the phase change material dots in one or more of the columns and rows is such that light wavelengths in an offset filtering range are attenuated by at least 40 percent to 60 percent when the phase change material dots are in a second state, wherein the offset filtering range is non-overlapping with a filtering range.

8. The phase change filter of claim 1, wherein light wavelengths in a filtering range are attenuated by at least 40 percent to 60 percent when the phase change material dots are in a first state and wherein light wavelengths in the filtering range are attenuated by less than 20 percent when the phase change material dots are in a second state.

9. The phase change filter of claim 8, wherein the first state is an amorphous state, and the second state is a crystalline state.

10. The phase change filter of claim 1, wherein the phase change filter is a notch filter with a notch of the notch filter having a central frequency in a range of 900 nm to 1000 nm.

11. The phase change filter of claim 1, wherein an electrically conductive material of the heating layer comprises Indium Tin Oxide.

12. The phase change filter of claim 1, wherein a material and a thickness of the heating layer are transparent to light in a filtering range, wherein transparent means an attenuation of 20 percent or less.

13. The phase change filter of claim 1, wherein the heating layer has a thickness of between 10 nm and 40 nm.

14. The phase change filter of claim 1, wherein each conductive finger has a smallest width in a plane of the heating layer in a range of 50 nm to 150 nm.

15. The phase change filter of claim 1, wherein a gap between conductive fingers has a maximum width in a plane of the heating layer in a range of 50 nm to 150 nm.

16. The phase change filter of claim 1, wherein a length of each conductive finger in a plane of the heating layer is of at least 250 nm.

17. An image sensor, comprising:
a layer of light sensitive elements;
a layer of color and infrared filters; and
the phase change filter of claim 1 stacked with said layer of color and infrared filters.

18. A method of fabricating a phase change filter, comprising:
forming a heating layer of electrically conductive material, the heating layer comprising a plurality of heating zones, each heating zone comprising one or more conductive fingers; and
forming a plurality of phase change material dots, wherein a phase change material dot of said plurality of phase change material dots is positioned on each heating zone of the heating layer.

19. A phase change filter, comprising:
a plurality of phase change material dots, wherein the phase change material dots are arranged in columns and rows of regular spacing, wherein a pitch of the phase change material dots in the columns and rows is in a range of 500 nm to 1000 nm.

20. The phase change filter of claim 19, wherein the pitch of the phase change material dots in one or more of the columns and rows is such that light wavelengths in a filtering range are attenuated by at least 40 percent to 60 percent when the phase change material dots are in a first state, and wherein the filtering range is within a wavelength range of 900 nm to 1000 nm.

21. The phase change filter of claim 20, wherein the filtering range is within a wavelength range of 920 nm to 960 nm.

22. The phase change filter of claim 20, wherein the phase change filter is a notch filter, wherein a notch of the notch filter has a central frequency in a range of 900 nm to 1000 nm.

23. The phase change filter of claim 20, wherein light wavelengths in the filtering range are attenuated by less than 20 percent when the phase change material dots are in a second state.

24. The phase change filter of claim 23, wherein the first state is an amorphous state, and the second state is a crystalline state.

25. The phase change filter of claim 20, wherein the pitch of the phase change material dots in one or more of the columns and rows is such that light wavelengths in an offset filtering range are attenuated by at least 40 percent to 60 percent when the phase change material dots are in a second state, wherein the offset filtering range is non-overlapping with the filtering range.

26. A method of fabricating a phase change filter, the method comprising:
forming a plurality of phase change material dots, each dot being formed of a phase change material, wherein the phase change material dots are formed in columns and rows of regular spacing, wherein a pitch of the phase change material dots in the columns and rows is in the range of 500 nm to 1000 nm.

\* \* \* \* \*